Oct. 21, 1952     C. A. SIVON     2,614,599

WIRE ANTISKID DEVICE

Filed April 15, 1949

INVENTOR.
CHARLES A. SIVON
BY

Patented Oct. 21, 1952

2,614,599

UNITED STATES PATENT OFFICE 2,614,599

WIRE ANTISKID DEVICE

Charles A. Sivon, Painesville, Ohio

Application April 15, 1949, Serial No. 87,593

6 Claims. (Cl. 152—211)

My invention relates to a corrugated zigzag wire adapted to be embedded in a tire or molded product and constructed from an elongated straight wire. Because one of the important uses of my wire structure is in tires, the use in that respect is here described. Tire manufacturers have discovered that tires would grip ice-covered surfaces much better in winter time if they had many small members of wire extending substantially vertically to the surface of the tread. However, it has always been a problem to mold the wires in tire treads and yet have a small portion thereof positioned to extend out of, or to the surface of, the tread. It has been discovered that wire from a coil or a long piece of wire could be formed into a zigzag fashion and this zigzag corrugated wire made to provide many small members of wire. My corrugated zigzag wire may be molded into the tread portion of the tire, or other products, such as stair treads, floor coverings and the like, where a non-skid surface is desired. As the tire or other surfaces wear, that part of the zigzag wire extendable from the tread or surface is worn through and will provide many short members or end portions of wire extendable outwardly from the surface of the tread of the tire to engage ice-covered roads or slippery pavement.

By "rubber-like" material, I mean natural and synthetic material or similar resilient plastic material.

It is to be understood that when referring to a zigzag wire, I use the term zigzag in its broad sense to mean that the wire assumes a laterally formed pattern in which portions of the wire are disposed or formed crosswise or transversely of the longitudinal dimension of the completed corrugated zigzag wire structure. These portions are referred to as zigs and zags. Although it is generally thought that a zig and a zag are at an acute angle to each other and are connected by a bent portion of the wire, referred to herein as a bend, I use the terms even though they, the lateral members, are spaced in an obtuse, parallel, or acute form. The bend is also broadly used to mean that portion of the wire interconnecting a zig and a zag even though it extends a distance substantially parallel to the longitudinal dimension of the completed corrugated zigzag wire structure. It is preferable to have the bend constructed in a shape other than circular so that these small members of wire will not be apt to rotate relative to a side rolling action of the tire and thereby become ejected and separated from the tire tread.

One of the objects of my invention is to provide a corrugated zigzag wire structure.

Another object of my invention is to provide a zigzag wire having corrugations wherein the corrugations are disposed at a vertical angle to the plane of the previously zigzagged wire.

Another object of my invention is to provide a continuous wire which may be molded in a tire tread or other surfaces to provide many wire members extending transversely or at an angle to the suface of the tread.

Other objects and a fuller understanding of the invention may be had by referring to the following description and claims, taken in conjunction with the accompanying drawings, in which:

Figure 1:
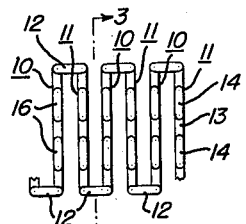
Figure 1 is a plan view of a section or portion of a strip of corrugated zigzag wire embodying the invention.
Figure 2:
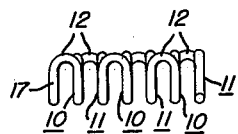
Figure 2 is a side view of Figure 1.
Figure 3:
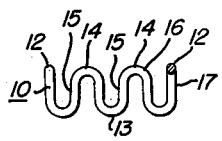
Figure 3 is an endwise view, taken along the line 3—3 of Figure 1 of the drawing.
Figure 4:
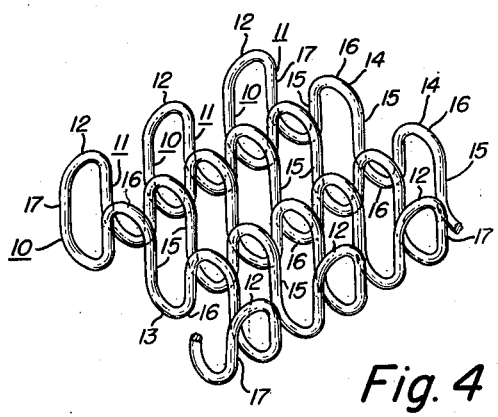
Figure 4 is an enlarged perspective view of a portion of the strip of corrugated zigzag wire.

In Figure 1 of my drawings, I illustrate a section of the corrugated zigzag wire constructed in accordance with the invention. This corrugated zigzag wire illustrated in Figure 1 comprises zigs 10 and zags 11 interconnected by bends 12. For purposes of description, I refer to the zigs 10 and zags 11 as being disposed in a reference plane with the corrugations disposed in planes extending at an angle to this reference plane. In the drawings, the corrugations are in a plane substantially transversely of the reference plane of the zigs and zags. However, it is understood that I do not wish to limit the angle between these planes to a right angle since the corrugations can be disposed in planes other than 90 degrees to the reference plane. Further I do not wish to limit the number of corrugations formed in a zig or in a zag to that number described and illustrated herein. It is understood that a greater or lesser number of corrugations can be formed in a zig or a zag by my process.

After my corrugated zigzag wire has been embedded in the tread of a tire for some time, and the tire has worn, the tops of the small corrugations close to the surface of the tire wear through, thus producing what appears to be a multitude of U-shaped wires embedded in the tire with the ends thereof extendable beyond the tread surface to engage ice or pavement. I have also discovered that by making the corrugations somewhat U-shaped with relatively long sides on each corrugation, the small pieces of wire remain embedded in the tire. When these many pieces of wire, which are preferably somewhat U-shaped, are other than circular, the small pieces of wire cannot rotate and thereby fall out of the tire. Many times it is preferable to construct the bends and the corrugations in a very sharp radius or in a somewhat V-shape instead of having them conform to the circular shape.

As shown in the drawings, the invention is directed to a corrugated zigzag wire structure comprising an elongated strip for embedment in a molded tire or product. The structure has both laterally and transversely extending corrugations to the plane of the strip and comprises a plurality of zigs 10 and zags 11 extending laterally to the plane of the strip. The bends 12 may be characterized as the first bends and integrally join the zigs and zags in series in a zigzag fashion laterally to the plane of the strip and space the zigs from the zags in a direction longitudinally of the strip. Each zig and zag consists of a series of intermediate portions 15, each extending transversely to the plane of the strip. The intermediate portions are preferably straight. The ends of the intermediate portions 15 are integrally joined in series by the second bends 16 in a corrugated fashion transversely to the plane of the strip. The second bends 16 space the intermediate portions 15 apart from each other in a direction laterally to the plane of the strip. As shown in the drawing, the intermediate portions which are integrally joined by the second bends produce a middle corrugation 13 and side corrugations 14.

The joined end portions of the zigs and zags constitute side portions 17 of the strip and extend transversely to the plane of the strip. The side portions 17 are substantially the same length as the intermediate portions 15. The intermediate portions 15 are spaced apart in a direction laterally to the plane of the strip at distances less than the transverse distance between the successive bends.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A corrugated zigzag wire structure comprising an elongated strip for embedment in a molded product, said structure having both laterally and transversely extending corrugations relative to the plane of the strip and comprising a plurality of zigs extending laterally of the plane of the strip, zags extending between said zigs and extending laterally of the plane of the strip, first bends integrally joining the said zigs and said zags in series in a sigzag fashion laterally of the plane of the strip and spacing the zigs from the zags in a direction longitudinally of the strip, each zig consisting of a series of portions each extending transversely of the plane of the strip, and second bends integrally joining the ends of said portions in series and spacing the said portions apart from each other in a direction laterally of the plane of the strip.

2. A corrugated zigzag wire structure comprising an elongated strip for embedment in a molded product, said structure having both laterally and transversely extending corrugations relative to the plane of the strip and comprising a plurality of zigs extending laterally of the plane of the strip, zags extending between said zigs and extending laterally of the plane of the strip, first bends integrally joining the said zigs and said zags in series in a zigzag fashion laterally of the plane of the strip and spacing the zigs from the zags in a direction longitudinally of the strip, each zig and zag consisting of a series of portions each extending in a direction away from the plane of the strip, and second bends integrally joining the ends of said portions in series and spacing the said portions apart from each other in a direction laterally of the plane of the strip.

3. A corrugated zigzag wire structure comprising an elongated strip for embedment in a molded product, said structure having both laterally and transversely extending corrugations relative to the plane of the strip and comprising a plurality of zigs extending laterally to the plane of the strip, zags extending between said zigs and extending laterally to the plane of the strip, first bends integrally joining the said zigs and said zags in series in a zigzag fashion laterally of the plane of the strip and spacing the zigs from the zags in a direction longitudinally of the strip, each zig and zag consisting of a series of relatively straight portions each extending at an angle to the plane of the strip, and second bends integrally joining the ends of said relatively straight portions in series and spacing the relatively straight portions apart from each other in a direction laterally of the plane of the strip.

4. A corrugated zigzag wire structure comprising an elongated strip for embedment in a molded product, said structure having both laterally and transversely extending corrugations relative to the plane of the strip and comprising a plurality of zigs extending laterally of the plane of the strip, zags extending between said zigs and extending laterally of the plane of the strip, first bends integrally joining the said zigs and said zags in series in a zigzag fashion laterally of the plane of the strip and spacing the zigs from the zags in a direction longitudinally of the strip, each zig and zag consisting of a series of intermediate portions each extending transversely of the plane of the strip, and second bends integrally joining the ends of said intermediate portions in series and spacing the intermediate portions apart from each other in a direction laterally of the plane of the strip, the joined end portions of said zigs and zags constituting side portions of the strip and extending transversely of the plane of the strip.

5. A corrugated zigzag wire structure comprising an elongated strip for embedment in a molded product, said structure having both laterally and transversely extending corrugations relative to the plane of the strip and comprising a plurality of zigs extending laterally of the plane of the strip, zags extending between said zigs and extending laterally of the plane of the strip, first bends integrally joining the said zigs and said zags in series in a zigzag fashion laterally of the plane of the strip and spacing the zigs from the zags in a direction longitudinally of the strip, each zig and each zag consisting of a series of intermediate portions each extending transversely of the plane of the strip, and second bends integrally joining the ends of said intermediate portions in series and spacing the intermediate portions apart from each other in a direction laterally of the plane of the strip, the joined end portions of said zigs and zags constituting side portions of the strip and extending transversely of the plane of the strip, said side portions being substantially the same length as said intermediate portions.

6. A corrugated zigzag wire structure comprising an elongated strip for embedment in a molded product, said structure having both laterally and transversely extending corrugations relative to the plane of the strip and comprising a plurality of zigs extending laterally of the plane of the strip, zags extending between said zigs and extending laterally of the plane of the strip, first bends integrally joining the said zigs and said zags in a series in a zigzag fashion laterally of the plane of the strip and spacing the zigs from the zags in a direction longitudinally of the strip, each zig consisting of a series of portions each extending transversely of the plane of the strip, and second bends integrally joining the ends of said portions in series and spacing the said portions apart from each other in a direction laterally to the plane of the strip, said portions being spaced apart in a direction laterally to the plane of the strip at distances less than the distance between the closest planes passing through the successive second bends on opposite lateral sides of said structure.

CHARLES A. SIVON.

REFERENCES CITED

The following references are of record in the file of this patent:

UNITED STATES PATENTS

| Number | Name | Date |
|---|---|---|
| 190,265 | Woodbury | May 1, 1877 |
| 345,767 | Buckley | July 20, 1886 |
| 381,017 | Jackson | Apr. 10, 1888 |
| 687,753 | Hoefer | Dec. 3, 1901 |
| 852,636 | Simmerly | May 7, 1907 |
| 865,288 | Baker | Sept. 3, 1907 |
| 951,630 | Cooley | Mar. 8, 1910 |
| 1,093,213 | Sloper | Apr. 14, 1914 |
| 1,149,356 | Fedders | Aug. 10, 1915 |
| 1,485,917 | Harter | Mar. 4, 1924 |
| 1,671,107 | Fricker | May 29, 1928 |
| 1,915,113 | Wood | June 20, 1933 |
| 2,001,273 | Greer | May 14, 1935 |
| 2,130,318 | Cruzan | Sept. 13, 1938 |
| 2,153,936 | Owens | Apr. 11, 1939 |
| 2,188,406 | Horton | Jan. 30, 1940 |
| 2,256,158 | Weisbender | Sept. 16, 1941 |
| 2,458,238 | Bailey | Jan. 4, 1949 |

FOREIGN PATENTS

| Number | Country | Date |
|---|---|---|
| 4,215 | Great Britain | Oct. 31, 1876 |